March 17, 1964 J. K. OXENHAM ET AL 3,125,631

CIRCUIT FOR SYNCHRONOUSLY DETECTING AND REMODULATING COLOR DIFFERENCE SIGNALS

Filed May 31, 1960 3 Sheets-Sheet 1

March 17, 1964 J. K. OXENHAM ETAL 3,125,631

CIRCUIT FOR SYNCHRONOUSLY DETECTING AND REMODULATING COLOR DIFFERENCE SIGNALS

Filed May 31, 1960 3 Sheets-Sheet 2

3,125,631
United States Patent Office
Patented Mar. 17, 1964

3,125,631

CIRCUIT FOR SYNCHRONOUSLY DETECTING AND REMODULATING COLOR DIFFERENCE SIGNALS

John Kenneth Oxenham and Reginald Graham, London, England, assignors to Sylvania-Thorn Colour Television Laboratories Limited, London, England Filed May 31, 1960, Ser. No. 32,732
4 Claims. (Cl. 178—5.4)

The present invention relates to color television receivers and is concerned with receivers of the type in which the information regarding three different colors modulated at three different phase angles on to a chroma sub-carrier to form a chroma signal is transferred to an index-frequency carrier, the frequency and phase of which is controlled by indexing means responsive to the traversal of color stripes on a cathode ray tube screen by a scanning beam of the tube.

The use of an index-frequency carrier is necessary when the electron beam scans rapidly across the color strips, in order that the electron beam may at all times be correctly modulated in intensity for achieving correct color rendering, in spite of the fact that there are always some irregularities in the rate at which the electron beam scans as well as in the spacing of the strips.

In some circuits, the transference of the chroma information from one carrier to another is carried out using a number of mixers. Mixers are of course non-linear devices and produce, in addition to the wanted signal, signals at harmonics of the two mixed signals and also at frequencies which are combinations of the harmonic frequencies. Some of the unwanted signals are of frequencies well removed from that of the wanted signal and can be removed by means of trap circuits which, however, are disadvantageous in that they increase the overall group delay of the circuit. Other unwanted signals are very close in frequency to the wanted signal and can only be removed by using mixers of special design.

It is an object of the present invention to simplify and improve color television receivers of the type specified.

According to the invention, a color television receiver of the type specified comprises three circuits each having a demodulating valve or transistor, the anode or collector of which is connected to the cathode or emitter of a modulating valve or transistor through a low-pass filter, means for applying three differently-phased reference signals of chroma sub-carrier frequency to the demodulating valves or transistors respectively, means for applying the chroma signal to the circuits, means for applying three carrier signals of index frequency to the modulating valves or transistors respectively and a tuned circuit for combining the outputs of the three modulating valves or transistors, the arrangement being such that, in operation, the chroma signal is demodulated at the three phase-angles of the three reference signals, the three demodulated signals passing through the low-pass filters, which attenuate heavily signals of chroma sub-carrier frequency, and being modulated on to the carriers of index frequency, and that three signals of index frequency at phase-angles spaced apart by 120° are produced and combined in the tuned circuit.

The three signals of index frequency at phase-angles spaced apart by 120° can be produced by applying carrier signals to the modulating valves or transistors at phase-angles spaced apart by 120°. Alternatively the three carrier signals can be of the same phase and 120° phase-shifts can be effected, by means of a delay line for instance, in the tuned combining circuit.

Among the advantages of the invention are the fact that there is only one tuned circuit at index-frequency and as this does not have to be of narrow band-width the group delay is small. The circuit cannot only give an equi-angular chroma signal appropriate to the scanning of the color strips but can also give an $M-Y$ signal which, combined with the luminance signal Y gives a signal M for application to control the overall brightness of the cathode ray tube.

These and other advantages of the invention will be explained more fully in the ensuing description which concerns two embodiments of the invention given by way of example. The description is made in conjunction with the accompanying drawings, in which.

Figure 1:
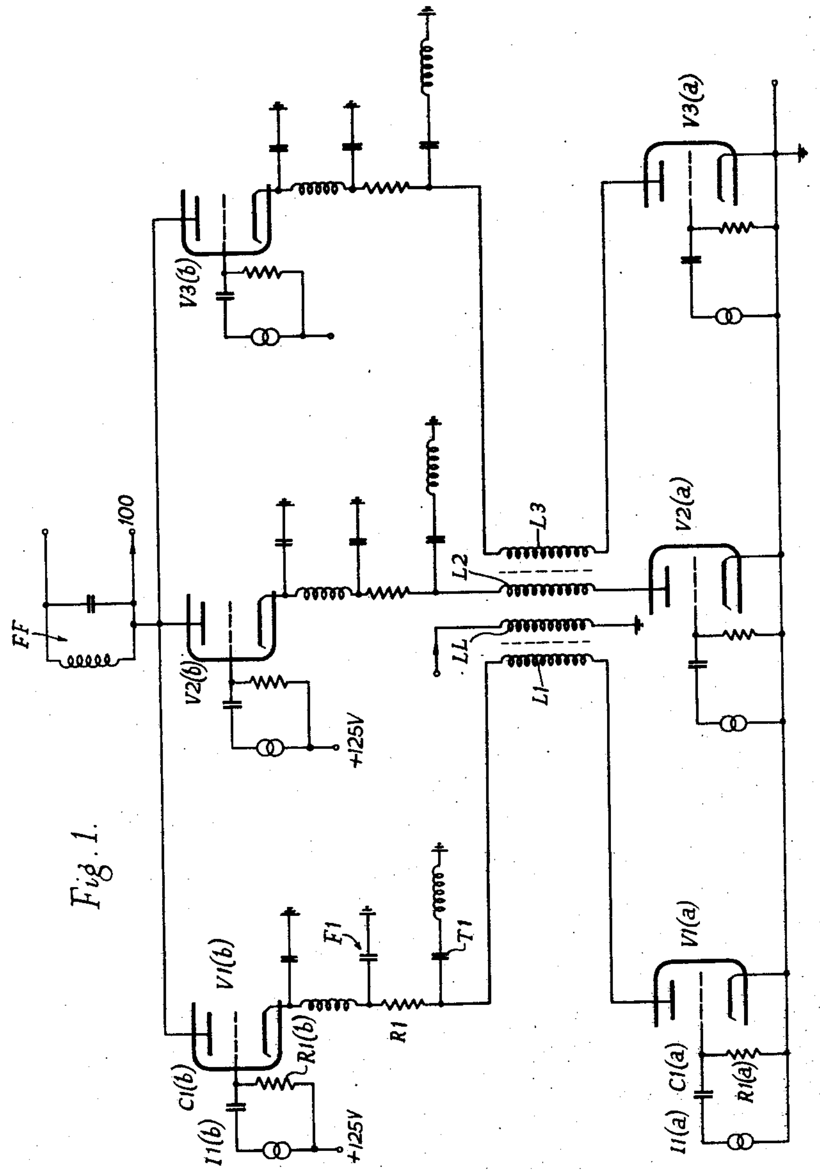
FIG. 1 is a circuit diagram of one embodiment of the invention.

The circuit shown in FIG. 1 is adapted to process the N.T.S.C. chroma signal which if demodulated at phase-angles of 121°, 219° and 353° gives signals 0.90 $(R-M)$, 0.83 $(G-M)$ and 0.67 $(B-M)$ where $$M=\tfrac{1}{3}(R+G+B)$$

It will immediately be apparent that these signals can be matrixed and added to give a signal $$0.30(R-M)+0.59(G-M)+0.11(B-M)=Y-M$$

The means required for doing this are well known in the art and are accordingly not described.

The circuit shown comprises three double triodes V1, V2 and V3, the two halves of which are designated V1($a$), V1($b$) and so on. The three triodes V1($a$), V2($a$) and V3($a$) constitute the lower valves of three cascode circuits and the triodes V1($b$), V2($b$) and V3($b$) the upper valves of the three cascode circuits respectively. The three circuits are similar and only the first will be described in detail.

The triode V1($a$) has its cathode connected to earth and its anode connected to the cathode of V1($b$) through a transformer winding L1, a resistor R1 and a low-pass filter F1 in that order. A 3.6 mc./s. trap circuit T1 is connected at the lower end of R1 in order to trap the signal at chroma sub-carrier frequency (approximately 3.58 mc./s.). An input terminal I1($a$) is connected to the grid of V1($a$) through a capacitor C1($a$) and a grid leak resistor R1($a$) is connected between the grid of V1($a$) and earth. The input terminal I1($b$) is connected to the grid of V1($b$) through a capacitor C1($b$) and a grid leak resistor R1($b$) is connected between the grid of V1($b$) and a source of potential of +125 v. The anode of V1($b$) is connected to an output terminal 100 and to a source of potential of +250 v. through a parallel resonant circuit FF. The terminal 100 and the circuit FF are common to all three cascode circuits.

The winding L1 and the windings L2 and L3 of the other cascode circuits are coupled to a chroma signal input winding LL.

V1($a$) is operated as a demodulator under class C conditions, being driven on its grid with a large signal of chroma sub-carrier frequency applied to I1($a$). This signal is supplied by a cohered oscillator controlled in known manner in response to the color bursts in the video-signal synchronising waveform and is arranged to be at a phase-angle of 121°. Similarly V2($a$) and V3($a$) are driven at phase-angles of 219° and 353°.

In considering the function of V1($a$) as a demodulator the presence of V1($b$) may be ignored since its grid is held at 125 v. positive and therefore its cathode potential will only vary by a few volts as the current in V1(a) varies. Accordingly the circuit may be considered as if the upper end of R1 were held at 125 v.

Figure 2:
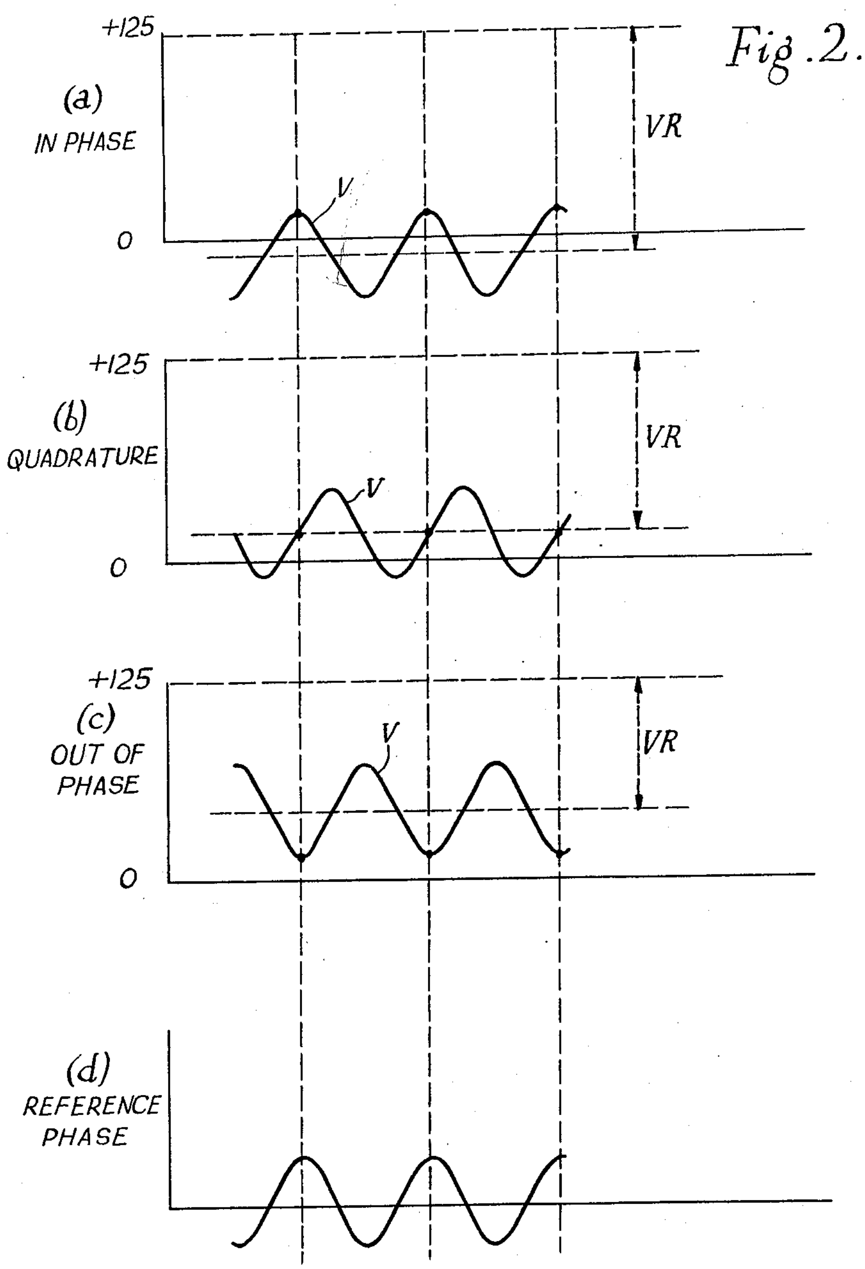
FIG. 2 is a diagram of certain waveforms used in explaining the manner of operation of the circuit shown in FIG. 1.

V1(a) acts as a grid-controlled rectifier and with no chroma input the high values of peak anode current bring the average anode potential down to a low value of the order of 20 v. If one assumes that, by virtue of the clamping action of the triode the instantaneous anode voltage at the instant of conduction is kept constant, then the demodulated output voltage VR will appear across R1 and will have a maximum excursion equal to the peak-to-peak chroma input. FIG. 2 shows the operating conditions for a chroma signal of constant amplitude (a) in phase, (b) in quadrature and (c) out of phase with the reference signal (d).

As the voltage across R1 varies the current through it, and hence through the triode V1(b), varies. V1(b) acts as a modulator, being fed with a carrier-signal of index-frequency $\omega$ at 0° applied to terminal I1(b). The index-carrier is supplied by means of one of the circuits described in the specification previously referred to for instance. V1(b) thus produces a signal at index-frequency in its anode circuit, the signal being amplitude-modulated with a peak-to-peak amplitude proportional to the current flowing through V1(b) (and R1). V1(b) can be operated under class C conditions, the index-signal being of large amplitude and the valve being cut off for most of the operating cycle. The anode current will then consist of narrow pulses of current occurring at index-frequency and the fundamental component will have a peak-to-peak amplitude of very nearly four times the average current through the valve. This mode of operation leads to a highly suitable form of signal for application to the cathode ray tube. The signals of index frequency $\omega$ applied to V2(b) and V3(b) are at 120° and 240° respectively.

The overall manner in which the circuit processes the chroma signal will now be considered. The phase-angles at which demodulation is effected result in a $(R-M)$ signal across the resistor R1 and $(G-M)$ and $(B-M)$ signals across the equivalent resistors of the other two cascode circuits. If all demodulators had equal gains the signals would be in the ratios $$0.90(R-M):0.83(G-M):0.67(B-M)$$

in accordance with the previous statement concerning the N.T.S.C. chroma signal. The signals are required with unity ratios and hence the demodulators must have gains in the ratios 1.11:1.21:1.49 or 1:1.09:1.34. This is conveniently achieved by using different chroma transformer ratios for each valve as shown in FIG. 1, the valves V1(a), V2(a) and V3(a) all having the same gain. Alternatively signals across the resistors R1 and so on in different ratios can be used, compensation being effected by making the gains of the modulators different.

Whatever the ratios of the signals across the resistors it is clear that they can be used to derive a $(Y-M)$ signal as previously suggested for the subsequent derivation of an M signal. (In usual practice the M luminance signal is applied to the cathode of the cathode ray tube and the processed chroma signal of frequency $\omega$ to the grid of the tube.)

The use of index carriers at phase-angles of 0°, 120° and 240° gives an equi-angular chroma signal and moreover by suitably arranging the overall gains of the cascode circuits as outlined above, the condition that, for $R=G=B$, and in particular for $R=G=B=0$, the chroma signal applied to the cathode ray tube is zero, is achieved since $$A \cos \omega t + A \cos (\omega t + 120°) + A \cos (\omega t + 240°) = 0$$

for all $t$.

It should here be mentioned that a process of demodulation and modulation need only be carried out at two phase-angles in order to preserve all the information in the chroma signal and that a $(Y-M)$ signal can be derived in such a process. However when only two phases (say in quadrature) are employed the outputs of the modulators must be zero when the chroma signal is zero. Otherwise, in contradistinction to the case of the circuit described with reference to FIG. 1, a resultant chroma signal would be applied to the cathode ray tube. The most convenient way of removing standing valve currents is to use balanced modulators, but then four phases in all are really used in contrast with the three of the invention.

Figure 3:
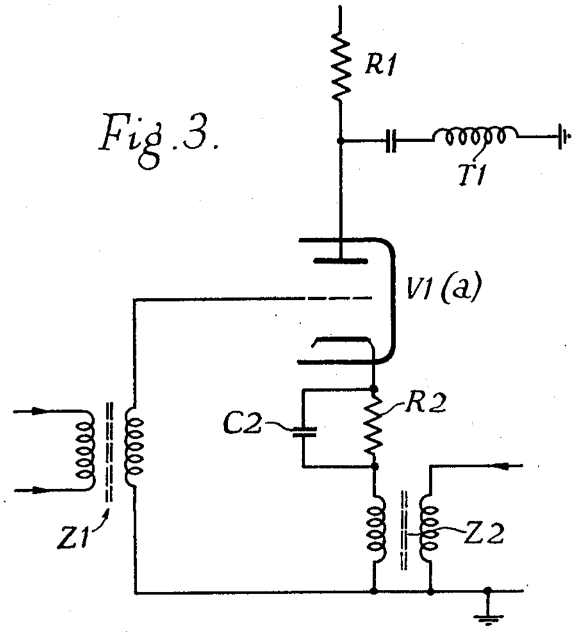
FIG. 3 is a circuit diagram illustrating certain modifications which are made to the circuit of FIG. 1 in the second embodiment.

In the second embodiment of the invention the demodulators are arranged differently. FIG. 3 shows the differing circuit arrangement for the triode V1(a). The anode is connected direct to the resistor R1 and the chroma signal is fed via a transformer Z1 to the grid. The cathode lead includes a bias resistor R2, by-passed by a capacitor C2, and one winding of a transformer Z2 by means of which the sub-carrier reference signal is applied to the triode. This is a conventional type of demodulator. The demodulator shown in FIG. 1 has the advantage of greater D.C. stability and hence of zero stability for the processed chroma signal.

The only tuned circuit at index-frequency in both embodiments is the circuit FF. The 3.6 mc./s. traps and the low-pass filters ensure that the modulators are fed only with the demodulated chroma information. The only signals, apart from the wanted signal, which can appear in the output of the circuit are harmonics of the index-carrier and harmonics of the demodulated chroma signals. The latter may be generated in the modulators, but they will be at a relatively low level and will be of frequency far removed from that of the wanted signal. Consequently FF can be wide-band, with little group delay.

Many variations can be made in the particular circuit arrangements shown. In one alternative demodulation is effected at more convenient phase-angles (say 0°, 120° and 240°) and the outputs are matrixed to give the signals required for application to the modulators to derive an equi-angular chroma signal.

It will be appreciated that the circuits shown and described can readily be modified by replacing the valves V1(a), V1(b) and so on by transistors. No such circuits using transistors are shown however as it will be entirely clear to those skilled in the art how to construct transistor equivalents of the valve circuits shown.

We claim:

1. In a color television receiver, apparatus comprising a transformer having first, second, third and fourth electromagnetically coupled windings; first, second and third low pass filters; and first, second, third, fourth, fifth and sixth electron discharge devices, each device having at least an anode and a cathode, the anodes of the even numbered devices being interconnected, the cathodes of the odd numbered devices being interconnected, the first winding and the first filter being connected in series between the anode of the first device and the cathode of the second device, the second winding and the second filter being connected in series between the anode of the third device and the cathode of the fourth device, the third winding and the third filter being connected in series between the anode of the fifth device and the cathode of the sixth device.

2. Apparatus as set forth in claim 1 further including a parallel resonant circuit coupled to the interconnected anodes of the even numbered devices.

3. Apparatus as set forth in claim 2 further including first, second and third resistors, said first resistor being in series with said first winding and said first filter, said second resistor being in series with said second winding and said second filter, said third resistor being in series with said third winding and said third resistor.

4. In a color television receiver, a circuit comprising a transformer having first, second, third and fourth electromagnetically coupled windings; first, second and third low pass filters; and first, second, third, fourth, fifth and sixth electron discharge devices, each device having at least an anode, a control grid, a cathode and an input circuit including said control grid, the anodes of the even numbered devices being interconnected, the cathodes of the odd numbered devices being interconnected, the first winding and the first filter being connected in series between the anode of the first device and the cathode of the second device, the second winding and the second filter being connected in series between the anode of the third device and the cathode of the fourth device, the third winding and the third filter being connected in series between the anode of the fifth device and the cathode of the sixth device.

References Cited in the file of this patent

UNITED STATES PATENTS

| | | |
|---|---|---|
| 2,752,420 | Ehrich | June 26, 1956 |
| 2,924,649 | Pritchard | Feb. 9, 1960 |

OTHER REFERENCES

Proceedings of the I.R.E., "Compatible Color Picture Presentation With the Single Gun Tricolor Chromatron," Gow and Dorr, pp. 308–314, January 1954 (copy in Patent Office Scientific Library).